May 7, 1968  A. BJARKO  3,381,804
CONTROL SWITCH SYSTEM FOR GRAIN AUGERS
Filed July 28, 1966
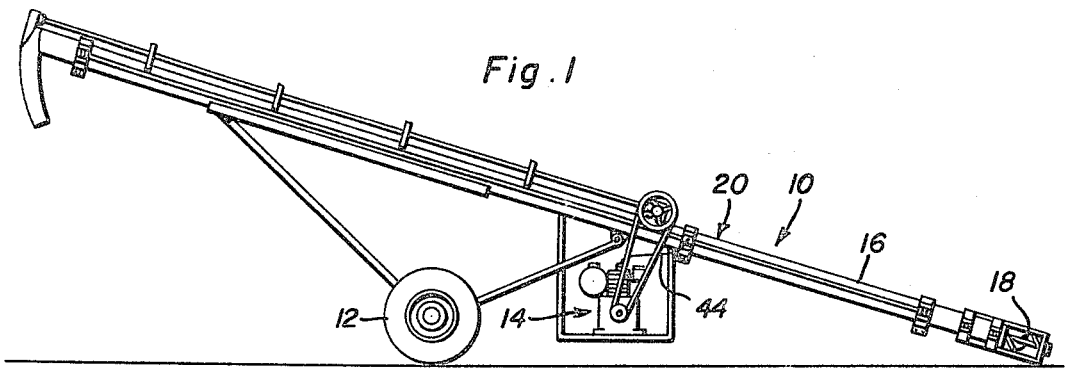
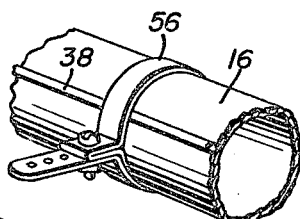
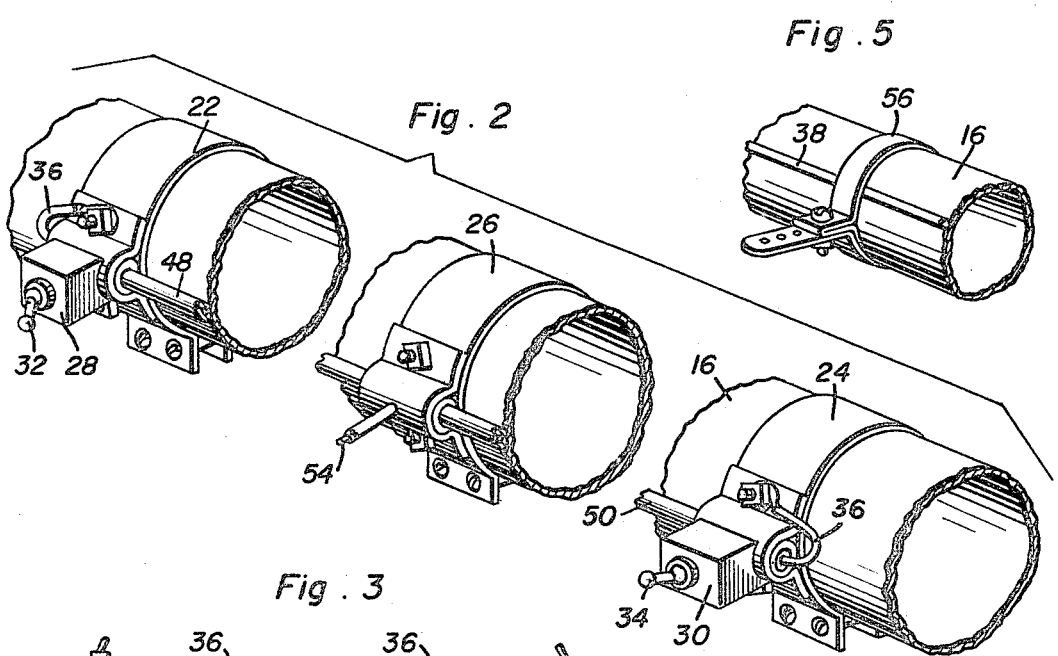
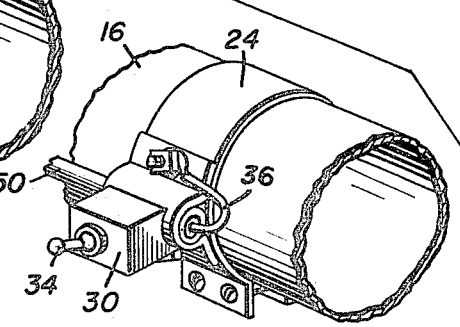
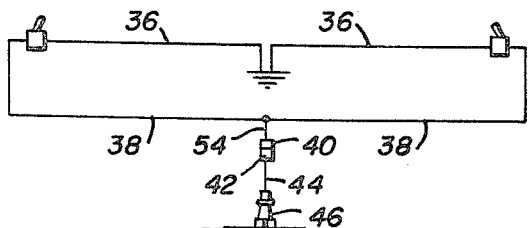
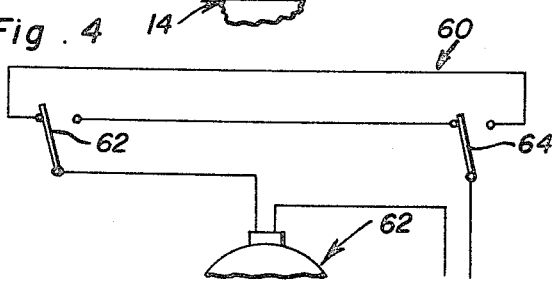
Albert Bjarko
INVENTOR.

United States Patent Office 3,381,804
Patented May 7, 1968

3,381,804
CONTROL SWITCH SYSTEM FOR GRAIN AUGERS
Albert Bjarko, 405 Mill St., Scobey, Mont. 59263
Filed July 28, 1966, Ser. No. 568,428
6 Claims. (Cl. 198—233)

ABSTRACT OF THE DISCLOSURE

A control system for a portable wheeled auger-type conveyor including motor means drivingly connected to the auger member of the conveyor, the control system including actuators disposed at opposite ends of the conveyor operable, when actuated, to terminate operation of the motor means by which the auger member is driven.

This invention relates to a novel and useful control switch system for grain augers and more specifically to control means, disposed at opposite ends of an auger-type conveyor, whereby the power source for driving the auger conveyor may be quickly turned off or rendered inoperative.

The control switch system of the instant invention is adapted to be used on any size or length auger conveyor provided either with a combustion engine including an electrical ignition system as a motive force for the auger or an electric motor as a motive source for the auger. Conventional auger conveyors of the type utilized to convey grain from a lower elevation to an upper elevation are conventionally provided with motor means supported from the conveyor assembly intermediate its opposite ends in depending relation and drivingly connected to the auger portion of the conveyor. Such motor means is usually provided with operating controls, immediately adjacent the motor means, for starting and stopping operation of the motor means. Accordingly, a person utilizing the conveyor, which in some instances may be relatively long, and disposed at one end of the conveyor must travel to an intermediate portion of the conveyor adjacent the motor means for terminating operation of the motor means. If a person is using the conveyor to load a truck and that person is disposed on the truck for the purpose of shifting the grain being discharged into the truck, as soon as the required amount of grain has been disposed in the truck he must dismount from the latter, move to a position adjacent the motor means of the conveyor, actuate a control for terminating operation of the conveyor, remount the truck, finish levelling the load in the truck, and then unroll a top or cover over the load before dismounting from the truck. If the auger conveyor was provided with a control disposed at the upper end thereof which could be actuated to terminate operation of the motor means for the conveyor, the operator of the conveyor would be saved the usual procedural steps of dismounting from the truck, moving to the motor means for the conveyor, terminating operation of the motor means for the conveyor, remounting the truck, and then finishing levelling off the load of the truck.

Accordingly, the main object of this invention is to provide a control switch system for grain augers including control means disposed at both the upper and lower ends of the auger conveyor which may be actuated for terminating operation of the motor means for the conveyor.

Another object of this invention, in accordance with the immediately preceding object, is to provide a control switch system in accordance with the preceding object, and which is operable from both ends of the conveyor to terminate operation of the motor means for the conveyor almost instantly whereby an operator of the conveyor may immediately terminate operation of the motor means therefor should some foreign object or a part of his being or clothing become entangled with the operating portions of the conveyor.

Still another object of this invention is to provide a control switch system in accordance with the preceding objects and constructed in a manner whereby it may be readily operatively connected to substantially all existing auger conveyors of the type set forth above.

A final object of this invention to be specifically enumerated herein is to provide a control switch system for grain augers which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of a conventional form of grain auger having the control switch system of the instant invention operatively associated therewith;

FIGURE 2 is a fragmentary enlarged perspective view of the grain auger illustrating the manner in which the control switch system may be supported from the tubular body of the auger conveyor;

FIGURE 3 is a diagrammatical view of the wiring circuit of the control switch system;

FIGURE 4 is a diagrammatical view of a modified form of wiring system illustrating the control switch system operative to actuate or terminate operation of an electric motor utilized to drive the conveyor; and FIGURE 5 is a fragmentary perspective view of the grain auger illustrating a slightly modified form of control switch system supported therefrom.

Referring now more specifically to the drawings the numeral 10 generally designates a conveyor form of grain auger including ground-engaging support wheel the means 12 and motor means generally referred to by the reference numeral 14 for driving the conveyor, the motor means 14 comprising an internal combustion engine of the magneto-ignition type.

The grain auger assembly 10 includes a tubular body 16 and is of conventional design having any suitable form of auger element 18 rotatably journaled therein, the internal combustion engine 14 being drivingly connected to the auger element 18 in any convenient manner (not shown).

The control switch system of the instant invention is generally designated by the reference numeral 20 and includes a plurality of clamp assemblies 22, 24 and 26 secured to the opposite end portions of the tubular body 16 and the mid-portion of the tubular body 16 adjacent the internal combustion engine 14. The clamp assemblies 22 and 24 support switch assemblies 28 and 30, respectively, therefrom, including switch actuators 32 and 34, respectively. The switch assemblies 28 and 30 each include a ground wire or conductor 36 grounded to the corresponding clamp assembly and a second wire or conductor 38 leading to a first plug member 40 releasably engaged with a second plug member 42 having a wire or conductor 44 extending therefrom to the spark plug 46 of the internal combustion engine. The plug members 40 and 42 electrically connect the conductors 38 with the conductor 44 and accordingly, either of the switch assemblies 28 and 30 may be closed by the corresponding actuators 32 and 34 to ground the spark plug 46 and thereby terminate operation of the internal combustion engine 14.

The control switch system 20 further includes a pair of tubular members 48 and 50 which extend between the clamp assemblies 22 and 24 and the clamp assembly 26 and through which the conductors 38 extend. In addition, the remote ends of the tubular members 48 are disposed within the confines of the clamp assemblies 22 and 24 and thereby protect the conductors 38 from the elements. Of course, the conductors 38 are joined within the confines of the clamp assembly 26 with a single conductor 54 extending from the conductors 38 to the plug member 40.

If the tubular members 48 and 50 are not utilized, the conductors 38 may be clampingly supported from the body 16 at various points spaced longitudinally along the latter by means of clamps 56, see FIGURE 5. Further, each of the clamps 22, 24, 26 and 56 is adjustable in size and may therefore be utilized on conveyor tubular bodies of different diameters.

With attention now invited more specifically to FIGURE 4 of the drawings, there will be seen a modified form of control switch system generally designated by the reference numeral 60 and adapted to be utilized in conjunction with an electric motor generally referred to by the reference numeral 62 if the latter is used in lieu of the internal combustion engine 14 for driving the auger 18 of the auger-type conveyor 10.

The control switch system 60 includes a pair of switch assemblies 62 and 64 corresponding to the switch assemblies 28 and 30 but which each may be selectively actuated to intiate or terminate operation of the electric motor 62. Each of the switches 62 and 64, independent of the setting of the other switch, may be actuated to terminate operation of the electric motor 62 if the latter is operating. In addition, each of the switch assemblies 62 and 64, independent of the setting of the other switch assembly, may be actuated to begin operation of the electric motor 62.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a portable auger type conveyor including a tubular body having an auger member journalled therein and motor means supported from said body drivingly connected to said auger and including electrical control means for terminating operation of said motor means, a pair of switch means carried by opposite end portions of said body electrically connected to said control means and including movable switch actuator means operative to cause termination of operation of said motor means, said switch means being electrically connected to said control means by means of elongated conductor means extending along said body between said switch means and said control means, a pair of clamp assemblies adjustable in size and removably clampingly engaged about opposite end portions of said body for adjustable positioning therealong, said pair of switch means being stationarily supported from said clamp assemblies for adjustment therewith, a third adjustable size clamp assembly removably and clampingly engaged about said body intermediate said pair of assemblies and to which said conductor means extend from said pair of switch means, said conductor means extending from said third clamp assembly to said control means.

2. The combination of claim 1, including tubular support means supported from and extending along said body intermediate said pair of clamp assemblies and said third clamp assembly and through which said conductor means extends.

3. The combination of claim 1 wherein said motor means comprises an internal combustion engine including an electrical ignition system comprising said electrical control means, said switch means each being operative upon its actuation to electrically short, by grounding, said electrical ignition system.

4. The combination of claim 1 wherein said motor means comprises an electric motor, said electrical control means comprising an electrical circuit adapted to electrically connect said motor to a suitable source of electrical potential, said switch means each being disposed in said electrical circuit and selectively operable, upon its actuation to selectively open said electrical circuit.

5. The combination of claim 4 wherein said switch means and said circuit include coacting means rendering said switch means each, upon their actuation, operable to selectively open and close said electrical circuit.

6. The combination of claim 1 wherein said motor means is generally centrally disposed between the opposite ends of said body and said switch means are disposed on opposite sides of a plane disposed normal to said body and passing through said motor means.

References Cited

UNITED STATES PATENTS

| | | | |
|---|---|---|---|
| 529,532 | 11/1894 | Scribner | 307—14 |
| 2,406,992 | 9/1946 | Butler | 219—44 |
| 2,533,261 | 12/1950 | Howe | 198—7 |
| 2,648,043 | 8/1953 | Grogl | 307—114 |
| 2,866,867 | 12/1958 | Anderson | 307—114 |
| 3,228,516 | 1/1966 | Sheehan | 198—139 |

RICHARD E. AEGERTER, *Primary Examiner.*